(12) United States Patent
Njemanze et al.

(10) Patent No.: US 8,056,130 B1
(45) Date of Patent: *Nov. 8, 2011

(54) REAL TIME MONITORING AND ANALYSIS OF EVENTS FROM MULTIPLE NETWORK SECURITY DEVICES

(75) Inventors: Hugh S. Njemanze, Los Altos, CA (US); Pravin S. Kothari, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 482 days.

This patent is subject to a terminal disclaimer.

(21) Appl. No.: 12/098,322

(22) Filed: Apr. 4, 2008

Related U.S. Application Data

(63) Continuation of application No. 10/308,415, filed on Dec. 2, 2002, now Pat. No. 7,376,969.

(51) Int. Cl.
  *G06F 21/00* (2006.01)
  *G06F 15/16* (2006.01)
(52) U.S. Cl. .......................................... 726/22; 709/224
(58) Field of Classification Search ........................ None
  See application file for complete search history.

(56) References Cited

U.S. PATENT DOCUMENTS

| | | |
|---|---|---|
| 5,557,742 A | 9/1996 | Smaha et al. |
| 5,717,919 A | 2/1998 | Kodavalla et al. |
| 5,850,516 A | 12/1998 | Schneier |
| 5,956,404 A | 9/1999 | Schneier et al. |
| 5,978,475 A | 11/1999 | Schneier et al. |
| 6,070,244 A | 5/2000 | Orchier et al. |
| 6,088,804 A | 7/2000 | Hill et al. |
| 6,134,664 A | 10/2000 | Walker |
| 6,192,034 B1 | 2/2001 | Hsieh et al. |
| 6,202,158 B1 | 3/2001 | Urano et al. |
| 6,275,942 B1 | 8/2001 | Bernhard et al. |
| 6,321,338 B1 | 11/2001 | Porras et al. |
| 6,347,374 B1 | 2/2002 | Drake et al. |
| 6,408,391 B1 | 6/2002 | Huff et al. |
| 6,408,404 B1 | 6/2002 | Ladwig |

(Continued)

FOREIGN PATENT DOCUMENTS

KR 20030035142 9/2003

(Continued)

OTHER PUBLICATIONS

"User Guide for Version 1.0 of the ArcSight Enterprise Security Center", 2001, ArcSight Inc., Version 1.0, p. 1,5,11,13,14,17-19,22-26,47,50,70,121,135,136,141,248,249,269-273.*

(Continued)

*Primary Examiner* — Christopher Revak

(57) ABSTRACT

Security events generated by a number of network devices are gathered and normalized to produce normalized security events in a common schema. The normalized security events are cross-correlated according to rules to generate meta-events. The security events may be gathered remotely from a system at which the cross-correlating is performed. Any meta-events that are generated may be reported by generating alerts for display at one or more computer consoles, or by sending an e-mail message, a pager message, a telephone message, and/or a facsimile message to an operator or other individual. In addition to reporting the meta-events, the present system allows for taking other actions specified by the rules, for example executing scripts or other programs to reconfigure one or more of the network devices, and or to modify or update access lists, etc.

35 Claims, 3 Drawing Sheets

U.S. PATENT DOCUMENTS

| | | | |
|---|---|---|---|
| 6,484,203 B1 | 11/2002 | Porras et al. | |
| 6,542,075 B2 | 4/2003 | Barker et al. | |
| 6,553,377 B1 | 4/2003 | Eschelbeck et al. | |
| 6,553,378 B1 | 4/2003 | Eschelbeck | |
| 6,567,808 B1 | 5/2003 | Eschelbeck et al. | |
| 6,694,362 B1 | 2/2004 | Secor et al. | |
| 6,704,874 B1 | 3/2004 | Porras et al. | |
| 6,708,212 B2 | 3/2004 | Porras et al. | |
| 6,711,615 B2 | 3/2004 | Porras et al. | |
| 6,839,850 B1 | 1/2005 | Campbell et al. | |
| 6,907,430 B2 | 6/2005 | Chong et al. | |
| 6,928,556 B2 | 8/2005 | Black et al. | |
| 6,966,015 B2 | 11/2005 | Steinberg et al. | |
| 6,985,920 B2 | 1/2006 | Bhattacharya et al. | |
| 6,988,208 B2 | 1/2006 | Hrabik et al. | |
| 6,996,551 B2 | 2/2006 | Hellerstein et al. | |
| 7,039,953 B2 | 5/2006 | Black et al. | |
| 7,043,727 B2 | 5/2006 | Bennett et al. | |
| 7,062,783 B1 | 6/2006 | Joiner | |
| 7,089,428 B2 | 8/2006 | Farley et al. | |
| 7,127,743 B1 | 10/2006 | Khanolkar et al. | |
| 7,134,141 B2 | 11/2006 | Crosbie et al. | |
| 7,143,444 B2 | 11/2006 | Porras et al. | |
| 7,154,857 B1 | 12/2006 | Joiner et al. | |
| 7,159,125 B2 | 1/2007 | Beadles et al. | |
| 7,159,237 B2 | 1/2007 | Schneier et al. | |
| 7,168,093 B2 | 1/2007 | Hrabik et al. | |
| 7,171,689 B2 | 1/2007 | Beavers | |
| 7,207,065 B2 | 4/2007 | Chess et al. | |
| 7,219,239 B1 | 5/2007 | Njemanze et al. | |
| 7,260,844 B1 | 8/2007 | Tidwell et al. | |
| 7,278,160 B2 | 10/2007 | Black et al. | |
| 7,308,689 B2 | 12/2007 | Black et al. | |
| 7,318,178 B2 | 1/2008 | Steinberg et al. | |
| 7,333,999 B1 | 2/2008 | Njemanze | |
| 7,340,776 B2 | 3/2008 | Zobel et al. | |
| 7,376,969 B1 * | 5/2008 | Njemanze et al. | 726/22 |
| 7,483,972 B2 | 1/2009 | Bhattacharya et al. | |
| 7,631,354 B2 * | 12/2009 | Ross et al. | 726/22 |
| 7,644,365 B2 | 1/2010 | Bhattacharya et al. | |
| 2002/0019945 A1 | 2/2002 | Houston et al. | |
| 2002/0038232 A1 | 3/2002 | Nihira | |
| 2002/0147803 A1 | 10/2002 | Dodd et al. | |
| 2002/0184532 A1 | 12/2002 | Hackenberger et al. | |
| 2003/0084349 A1 * | 5/2003 | Friedrichs et al. | 713/201 |
| 2003/0093514 A1 | 5/2003 | Valdes et al. | |
| 2003/0093692 A1 | 5/2003 | Porras | |
| 2003/0188189 A1 | 10/2003 | Desai et al. | |
| 2003/0221123 A1 | 11/2003 | Beavers | |
| 2004/0010718 A1 | 1/2004 | Porras et al. | |
| 2004/0024864 A1 | 2/2004 | Porras et al. | |
| 2004/0044912 A1 | 3/2004 | Connary et al. | |
| 2004/0181685 A1 | 9/2004 | Marwaha | |
| 2004/0221191 A1 | 11/2004 | Porras et al. | |
| 2004/0260947 A1 | 12/2004 | Brady et al. | |
| 2005/0027845 A1 | 2/2005 | Secor et al. | |
| 2005/0028002 A1 | 2/2005 | Christodorescu et al. | |
| 2005/0204404 A1 | 9/2005 | Hrabik et al. | |
| 2005/0251860 A1 | 11/2005 | Saurabh et al. | |
| 2005/0257264 A1 | 11/2005 | Stolfo et al. | |
| 2006/0095587 A1 | 5/2006 | Bhattacharya et al. | |
| 2006/0212932 A1 | 9/2006 | Patrick et al. | |
| 2007/0118905 A1 | 5/2007 | Morin et al. | |
| 2007/0136437 A1 | 6/2007 | Shankar et al. | |
| 2007/0143842 A1 * | 6/2007 | Turner et al. | 726/22 |
| 2007/0150579 A1 | 6/2007 | Morin et al. | |
| 2007/0162973 A1 | 7/2007 | Schneier et al. | |
| 2007/0169038 A1 | 7/2007 | Shankar et al. | |
| 2007/0234426 A1 | 10/2007 | Khanolkar et al. | |
| 2007/0260931 A1 | 11/2007 | Aguilar-Macias et al. | |
| 2008/0104046 A1 | 5/2008 | Singla et al. | |
| 2008/0104276 A1 | 5/2008 | Lahoti et al. | |
| 2008/0162592 A1 | 7/2008 | Huang et al. | |
| 2008/0165000 A1 | 7/2008 | Morin et al. | |
| 2009/0319659 A1 * | 12/2009 | Terasaki et al. | 709/224 |
| 2010/0058165 A1 | 3/2010 | Bhattacharya et al. | |
| 2011/0161848 A1 * | 6/2011 | Purcell et al. | 715/764 |

FOREIGN PATENT DOCUMENTS

| | | |
|---|---|---|
| KR | 20030035143 | 9/2003 |
| WO | WO 02/045315 A2 | 6/2002 |
| WO | WO 02/060117 A1 | 8/2002 |
| WO | WO 02/078262 A1 | 10/2002 |
| WO | WO 02/101988 A2 | 12/2002 |
| WO | WO 03/009531 A2 | 1/2003 |
| WO | WO 2004/019186 A2 | 3/2004 |
| WO | WO 2005/001655 | 1/2005 |
| WO | WO 2005/026900 | 3/2005 |

OTHER PUBLICATIONS

U.S. Appl. No. 10/308,767, filed Dec. 2, 2002.
U.S. Appl. No. 10/308,548, filed Dec. 2, 2002.
U.S. Appl. No. 10/308,941, filed Dec. 2, 2002.
U.S. Appl. No. 10/308,416, filed Dec. 2, 2002.
U.S. Appl. No. 10/308,418, filed Dec. 2, 2002.
U.S. Appl. No. 10/308,417, filed Dec. 2, 2002.
U.S. Appl. No. 10/308,584, filed Dec. 2, 2002.
U.S. Appl. No. 10/733,073, filed Dec. 10, 2003.
U.S. Appl. No. 10/713,471, filed Nov. 14, 2003.
U.S. Appl. No. 10/683,221, filed Oct. 10, 2003.
U.S. Appl. No. 10/683,191, filed Oct. 10, 2003.
U.S. Appl. No. 10/821,459, filed Apr. 9, 2004.
U.S. Appl. No. 10/839,563, filed May 4, 2004.
U.S. Appl. No. 10/976,075, filed Oct. 27, 2004.
U.S. Appl. No. 10/975,962, filed Oct. 27, 2004.
U.S. Appl. No. 10/974,105, filed Oct. 27, 2004.
U.S. Appl. No. 11/029,920, filed Jan. 4, 2005.
U.S. Appl. No. 11/021,601, filed Dec. 23, 2004.
U.S. Appl. No. 11/070,024, filed Mar. 1, 2005.
U.S. Appl. No. 11/740,203, filed Apr. 25, 2007.
U.S. Appl. No. 11/836,251, filed Aug. 9, 2007.
U.S. Appl. No. 11/023,942, filed Dec. 24, 2004, pp. 1-26.
ArcSight, "About ArcSight Team," date unknown, [online] [Retrieved on Oct. 25, 2002] Retrieved from the Internet <URL: http://www.arcsight.com/about_team.htm>.
ArcSight, "About Overview," Oct. 14, 2002, [online] [Retrieved on Apr. 21, 2006] Retrieved from the Internet <URL: http://web.archive.org/web/20021014041614/http://www.arcsight.com/about.htm>.
ArcSight, "Contact Info," date unknown, [online] [Retrieved on Oct. 25, 2002] Retrieved from the Internet <URL: http://www.arcsight.com/contact.htm>.
ArcSight, "Enterprise Coverage: Technology Architecture," date unknown, [online] [Retrieved on Nov. 11, 2007] Retrieved from the Internet <URL: http://www.snaiso.com/Documentation/Arcsight/arcsight_archdta.pdf>.
U.S. Appl. No. 60/405,921, filed Aug. 26, 2002, Gisby et al.
ArcSight, "Managed Process: ArcSight Reporting System," date unknown, [online] [Retrieved on Nov. 11, 2007] Retrieved from the Internet <URL: http://www.snaiso.com/Documentation/Arcsight/arcsight_reportsys.pdf>.
ArcSight, "Managed Process: Console-Based Management," date unknown, [online] [Retrieved on Nov. 11, 2007] Retrieved from the Internet <URL: http://www.snaiso.com/Documentation/Arcsight/arcsight_console.pdf >.
ArcSight, "Precision Intelligence: SmartRules™ and Cross-Correlation," date unknown, [online] [Retrieved on Nov. 11, 2007] Retrieved from the Internet <URL: http://www.snaiso.com/Documentation/Arcsight/arcsight_correlation.pdf>.
ArcSight, "Precision Intelligence: SmartAgent™," date unknown, [online] [Retrieved on Nov. 11, 2007] Retrieved from the Internet <URL: http://www.ossmanagement.com/SmartAgent.pdf>.
ArcSight, "Product Info: Product Overview and Architecture," date unknown, [online] [Retrieved on Oct. 25, 2002] Retrieved from the Internet <URL: http://www.arcsight.com/product.htm>.
ArcSight, "Product Info: 360° Intelligence Yields Precision Risk Management," date unknown, [online] [Retrieved on Oct. 25, 2002] Retrieved from the Internet <URL: http://www.arcsight.com/product_info01.htm>.
ArcSight, "Product Info: ArcSight SmartAgents," Oct. 10, 2002, [online] [Retrieved on Apr. 21, 2006] Retrieved from the Internet <URL:http://web.archive.org/web/20021010135236/http://www.arcsight.com/product_info02.htm>.
ArcSight, "Product Info: ArcSight Cross-Device Correlation," date unknown, [online] [Retrieved on Oct. 25, 2005] Retrieved from the Internet <URL: http://www.arcsight.com/product_info03.htm>.
ArcSight, "Product Info: ArcSight Manager," date unknown, [online] [Retrieved on Oct. 25, 2002] Retrieved from the Internet <URL: http://www.arcsight.com/product_info04.htm>.
ArcSight, "Product Info: ArcSight Console," date unknown, [online] [Retrieved on Nov. 15, 2002] Retrieved from the Internet <URL: http:www.arcsight.com/product_info05.htm>.
ArcSight, "Product Info: ArcSight Reporting System," date unknown, [online] [Retrieved on Oct. 25, 2002] Retrieved from the Internet <URL: http:www.arcsight.com/product_info06.htm>.
ArcSight, "Product Info: Enterprise Scaling," date unknown, [online] [Retrieved on Oct. 25, 2002] Retrieved from the Internet <URL: http://www.arcsight.com/product_info07.htm>.
ArcSight, "Security Management for the Enterprise," 2002, [online] [Retrieved on Oct. 25, 2002] Retrieved from the Internet <URL: http:www.arcsight.com/>.
ArcSight, "Technical Brief: How Correlation Eliminates False Positives," date unknown, source unknown.
Bruneau, G., "What Difficulties are Associated on Matching Events with Attacks. Why is Event/Data Correlation Important?," 2001, [online] [Retrieved on Nov. 1, 2002] Retrieved from the Internet <URL: http://www.sans.org/newlook/resources/IDFAQ/matching.htm>.
Burleson, D., "Taking Advantage of Object Partitioning in Oracle8i," Nov. 8, 2000, [online] [Retrieved on Apr. 20, 2004] Retrieved from the Internet <URL: http://www.dba-oracle.com/art_partit.htm>.
CERT Coordination Center, "Overview of Attack Trends," 2002, [online] Retrieved from the Internet <URL: http://www.cert.org/archive/pdf/attack_trends.pdf>.
Cheung, S. et al., "EMERALD Intrusion Incident Report: 601 Message Specification," Aug. 10, 2000, System Design Laboratory, SRI International.
Derodeff, C. "Got Correlation? Not Without Normalization," 2002, [online] [Retrieved on Nov. 11, 2007] Retrieved from the Internet <URL: http://www.svic.com/papers/pdf/Got-Correlation_rmalization.pdf>.
Dubie, D., "Security management wares get smarts: Companies add business reporting and compliance management features to software offerings," Network World, Oct. 4, 2004, p. 26.
Dubie, D., "Users shoring up net security with SIM," Network World, Sep. 30, 2002, pp. 21-22, vol. 19, No. 39.
Haley Enterprise, "Production Systems," 2002, [online] [Retrieved on Oct. 29, 2002] Retrieved from the Internet <URL: http://www.haley.com/0072567836705810/ProductionSystems.html>.
Haley Enterprise, "The Rete Algorithm," 2002, [online] [Retrieved on Oct. 29, 2002] Retrieved from the Internet <URL: http://www.haley.com/0072567836705810/ReteAlgorithm.html>.
Haley Enterprise, "A Rules Engine for Java Based on the Rete Algorithm," 2002, [online] [Retrieved on Oct. 29, 2002] Retrieved from the Internet <URL: http://www.haley.com/0072567836705810/ReteAlgorithmForRules.html>.

Halme, L.R. et al., "AINT Misbehaving: A Taxonomy of Anti-Intrusion Techniques," 2000, [online] [Retrieved on Nov. 1, 2002] Retrieved from the Internet <URL: http://www.sans.org/newlook/resources/IDFAQ/aint.htm>.
Heberlein, L. T., et al., "A Method to Detect Intrusive Activity in a Networked Environment," Proceedings of the Fourteenth National Computer Security Conference, NIST/NCSC, Oct. 1-4, 1991, Washington, D.C., pp. 362-371.
Ingargiola, G., "The Rete Algorithm," date unknown, [online] [Retrieved on Oct. 29, 2002] Retrieved from the Internet <URL: http://yoda.cis.temple.edu:8080/UGAIWWW/lectures/rete.html>.
Javitz, H. S., et al., "The NIDES Statistical Component Description and Justification," SRI Project 3131, Contract N00039-92-C-0015, Annual Report, A010, Mar. 7, 1994.
Jou, Y. F., et al., "Architecture Design of a Scalable Intrusion Detection System for the Emerging Network Infrastructure," MCNC, Technical Report CDRL A005, Apr. 1997.
Lindqvist, U. et al., "Detecting Computer and Network Misuse Through the Production-Based Expert System Toolset (P-BEST)," Proceedings of the IEEE Symposium on Security and Privacy, Oakland, California, May 9-12, 1999.
National Institute of Standards and Technology (NIST), "Federal Information Processing Standards Publication (FIPS Pub) 199: Standards for Security Categorization of Federal Information and Information Systems", Feb. 2004.
National Institutes of Health (NIH), "Table 1: Security Categorization of Federal Information and Information Systems," revised Jul. 8, 2005, [online] [retrieved on Apr. 6, 2006] Retrieved from the Internet <URL: http://irm.cit.nih.gov/security/table1.htm>.
Porras, P.A. et al., "EMERALD: Event Monitoring Enabling Responses to Anomalous Live Disturbances," Oct. 1997, Proceedings of the $20^{th}$ NIST-NCSC National Information Systems Security (NISS) Conference.
Porras, P.A. et al., "A Mission-Impact-Based Approach to INFOSEC Alarm Correlation," Oct. 2002, Lecture Notes in Computer Science, Proceedings: Recent Advances in Intrusion Detection, pp. 95-114, Zurich, Switzerland.
Porras, P. A., et al., "Live Traffic Analysis of TCP/IP Gateways," Symposium on Networks and Distributed Systems Security, Internet Society, Mar. 1998.
Robinson, S. L., "Memorandum Opinion" in *SRI International, Inc. v. Internet Security Systems, Inc. and Symantec Corporation* (D. Del., Civ. No. 04-1199-SLR), Oct. 17, 2006.
Valdes, A., et al., "Statistical Methods for Computer Usage Anomaly Detection Using NIDES (Next-Generation Intrusion Detection Expert System)," Proceedings of the Third International Workshop on Rough Sets and Soft Computing (RSSC), Nov. 10-12, 1994, San Jose, CA, pp. 306-311.
Wood, M., et al., "Internet-Draft: Intrusion Detection Message Exchange Requirements," Jun. 23, 2002, [online] [Retrieved on Nov. 1, 2002] Retrieved from the Internet <URL: http://www.silicondefense.com/idwg/draft-ietf-idwg-requirements-07.txt>.

* cited by examiner

REAL TIME MONITORING AND ANALYSIS OF EVENTS FROM MULTIPLE NETWORK SECURITY DEVICES

CROSS-REFERENCE TO RELATED APPLICATION

The present application is a continuation of U.S. patent application Ser. No. 10/308,415, filed on Dec. 2, 2002, entitled "Real Time Monitoring and Analysis of Events from Multiple Network Security Devices" (U.S. Pat. No. 7,376,969), which is incorporated herein by reference.

FIELD OF THE INVENTION

The present invention relates to a computer-based system for capturing security events from heterogeneous sources, normalizing such events to a common schema and cross-correlating such normalized events with rules to create meta-events.

BACKGROUND

Computer networks and systems have become indispensable tools for modern business. Today terabits of information on virtually every subject imaginable are stored in and accessed across such networks by users throughout the world. Much of this information is, to some degree, confidential and its protection is required. Not surprisingly then, intrusion detection systems (IDS) have been developed to help uncover attempts by unauthorized persons and/or devices to gain access to computer networks and the information stored therein. In addition, network devices such as routers and firewalls maintain activity logs that can be used to examine such attempts.

Intrusion detection may be regarded as the art of detecting inappropriate, incorrect or anomalous activity within or concerning a computer network or system. The most common approaches to intrusion detection are statistical anomaly detection and pattern-matching detection. IDS that operate on a host to detect malicious activity on that host are called host-based IDS (and may exist in the form of host wrappers/personal firewalls or agent-based software), and those that operate on network data flows are called network-based IDS. Host-based intrusion detection involves loading software on the system (the host) to be monitored and using log files and/or the host's auditing agents as sources of data. In contrast, a network-based intrusion detection system monitors the traffic on its network segment and uses that traffic as a data source. Packets captured by the network interface cards are considered to be of interest if they match a signature.

Regardless of the data source, there are two complementary approaches to detecting intrusions: knowledge-based approaches and behavior-based approaches. Almost all IDS tools in use today are knowledge-based. Knowledge-based intrusion detection techniques involve comparing the captured data to information regarding known techniques to exploit vulnerabilities. When a match is detected, an alarm is triggered. Behavior-based intrusion detection techniques, on the other hand, attempt to spot intrusions by observing deviations from normal or expected behaviors of the system or the users (models of which are extracted from reference information collected by various means). When a suspected deviation is observed, an alarm is generated.

Advantages of the knowledge-based approaches are that they have the potential for very low false alarm rates, and the contextual analysis proposed by the intrusion detection system is detailed, making it easier for a security officer using such an intrusion detection system to take preventive or corrective action. Drawbacks include the difficulty in gathering the required information on the known attacks and keeping it up to date with new vulnerabilities and environments.

Advantages of behavior-based approaches are that they can detect attempts to exploit new and unforeseen vulnerabilities. They are also less dependent on system specifics. However, the high false alarm rate is generally cited as a significant drawback of these techniques and because behaviors can change over time, the incidence of such false alarms can increase.

Regardless of whether a host-based or a network-based implementation is adopted and whether that implementation is knowledge-based or behavior-based, an intrusion detection system is only as useful as its ability to discriminate between normal system usage and true intrusions (accompanied by appropriate alerts). If intrusions can be detected and the appropriate personnel notified in a prompt fashion, measures can be taken to avoid compromises to the protected system. Otherwise such safeguarding cannot be provided. Accordingly, what is needed is a system that can provide accurate and timely intrusion detection and alert generation so as to effectively combat attempts to compromise a computer network or system.

SUMMARY OF THE INVENTION

In one embodiment, the present invention provides for gathering security events generated by a number of network devices; normalizing the security events to produce normalized security events in a common schema; and cross-correlating the normalized security events according to rules to generate meta-events. The security events may be gathered remotely from a system at which the cross-correlating of the normalized security events with the rules is performed. Any meta-events that are generated may be reported by generating alerts for display at one or more computer consoles, or by sending an e-mail message, a pager message, a telephone message, and/or a facsimile message to an operator or other individual. In addition to reporting the meta-events, the present system allows for taking other actions specified by the rules, for example executing scripts or other programs to reconfigure one or more of the network devices, and or to modify or update access lists, etc. The security events may be gathered from routers, e-mail logs, anti-virus products, firewalls, network intrusion detection systems, access control servers, virtual private network systems, and/or other network devices among other sources (e.g., logs from operating systems such as WindowsNT Eventlog, Unix Syslog, etc.; databases and software applications).

Normalizing the security events involves parsing data reported by the various network devices to extract event field values therefrom and populating corresponding fields in the common schema with the extracted event field values. Filters may be employed to remove unwanted security events. Moreover, two or more normalized security events may be aggregated prior to cross-correlating the normalized security events with the rules. Such aggregation can preserve bandwidth where the normalized security events are transmitted across a network prior to being cross-correlated with the rules.

BRIEF DESCRIPTION OF THE DRAWINGS

The present invention is illustrated by way of example, and not limitation, in the figures of the accompanying drawings in which.

DETAILED DESCRIPTION

Figure 1:
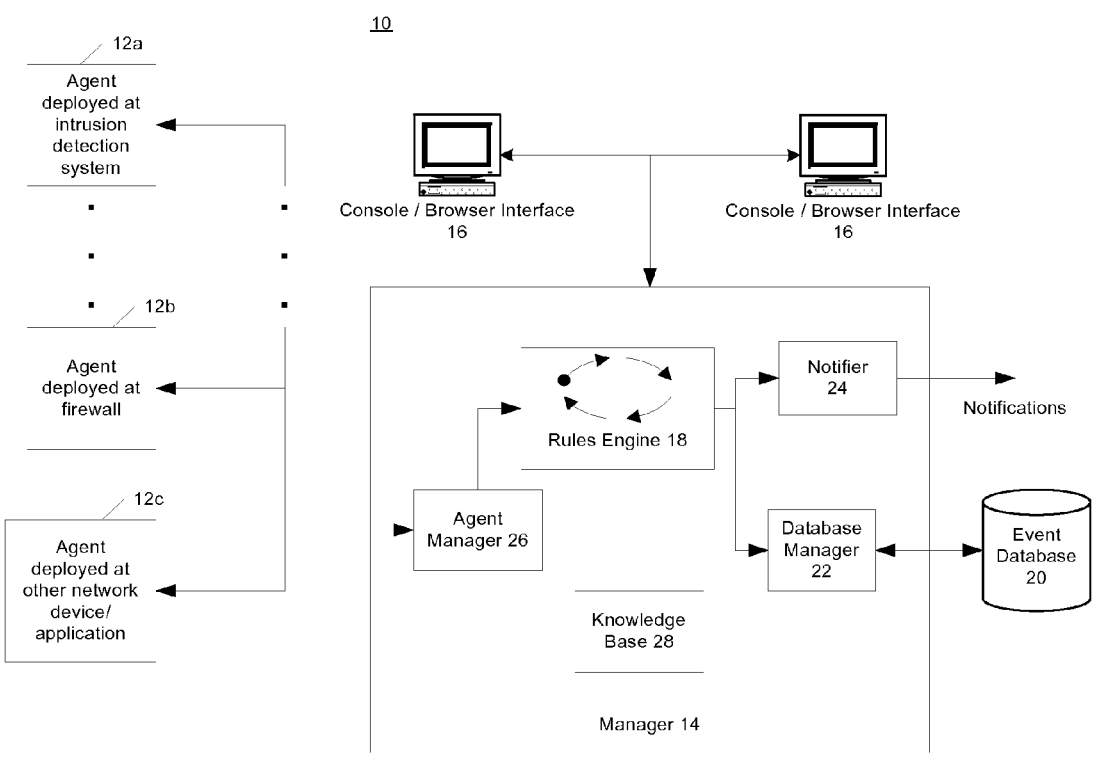
FIG. 1 illustrates one embodiment of a computer-based system for capturing, normalizing and reporting security events from heterogeneous sources configured in accordance with the present invention.

Described herein is a computer-based system for capturing security events from heterogeneous sources, normalizing such events to a common schema and cross-correlating such normalized events with rules to create meta-events. The system (one embodiment of which is manifest as computer software) enables aggregation, correlation, detection, and investigative tracking of suspicious network activities from multiple security devices. The present system also supports response management, ad-hoc query resolution, reporting and replay for forensics analysis, and graphical visualization of network threats and activity.

Although the present system will be discussed with reference to various illustrated examples, these examples should not be read to limit the broader spirit and scope of the present invention. For example, the examples presented herein describe distributed agents, managers and consoles, which are but one embodiment of the present invention. The general concepts and reach of the present invention are much broader and may extend to any computer-based or network-based security system. Also, examples of the messages that may be passed to and from the components of the system and the data schemas that may be used by components of the system are given in an attempt to further describe the present invention, but are not meant to be all-inclusive examples and should not be regarded as such.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Referring now to FIG. 1, an example of a computer-based system 10 architected in accordance with an embodiment of the present invention is illustrated. System 10 includes agents 12, one or more managers 14 and one or more consoles 16 (which may include browser-based versions thereof). In some embodiments, agents, managers and/or consoles may be combined in a single platform or distributed in two, three or more platforms (such as in the illustrated example). The use of this multi-tier architecture supports scalability as a computer network or system grows.

Agents 12 are software programs that provide efficient, real-time (or near real-time) local event data capture and filtering from a variety of network security devices and/or applications. The primary sources of security events are common network elements including firewalls, intrusion detection systems and operating system logs. Agents 12 can collect events from any source that produces event logs or messages and can operate at the native device, at consolidation points within the network, and/or through simple network management protocol (SNMP) traps.

Agents 12 are configurable through both manual and automated processes and via associated configuration files. Each agent 12 may include one or more software modules including a normalizing component, a time correction component, an aggregation component, a batching component, a resolver component, a transport component, and/or additional components. These components may be activated and/or deactivated through appropriate commands in the configuration file.

Managers 14 are server-based components that further consolidate, filter and cross-correlate events received from the agents, employing a rules engine 18 and a centralized event database 20. One role of manager 14 is to capture and store all of the real-time and historic event data to construct (via database manager 22) a complete, enterprise-wide picture of security activity. The manager 14 also provides centralized administration, notification (through one or more notifiers 24), and reporting, as well as a knowledge base 28 and case management workflow. The manager 14 may be deployed on any computer hardware platform and one embodiment utilizes a relational database management system such as an Oracle™ database to implement the event data store component. Communications between manager 14 and agents 12 may be bi-directional (e.g., to allow manager 14 to transmit commands to the platforms hosting agents 12) and encrypted. In some installations, managers 14 may act as concentrators for multiple agents 12 and can forward information to other managers (e.g., deployed at a corporate headquarters).

Consoles 16 are computer- (e.g., workstation-) based applications that allow security professionals to perform day-to-day administrative and operation tasks such as event monitoring, rules authoring, incident investigation and reporting. Access control lists allow multiple security professionals to use the same system and event database, with each having their own views, correlation rules, alerts, reports and knowledge base appropriate to their responsibilities. A single manager 14 can support multiple consoles 16.

In some embodiments, a browser-based version of the console 16 may be used to provide access to security events, knowledge base articles, reports, notifications and cases. That is, the manager 14 may include a web server component accessible via a web browser hosted on a personal or hand-held computer (which takes the place of console 16) to provide some or all of the functionality of a console 16. Browser access is particularly useful for security professionals that are away from the consoles 16 and for part-time users. Communication between consoles 16 and manager 14 is bi-directional and may be encrypted.

Through the above-described architecture the present invention can support a centralized or decentralized environment. This is useful because an organization may want to implement a single instance of system 10 and use an access control list to partition users. Alternatively, the organization may choose to deploy separate systems 10 for each of a number of groups and consolidate the results at a "master" level. Such a deployment can also achieve a "follow-the-sun" arrangement where geographically dispersed peer groups collaborate with each other by passing primary oversight responsibility to the group currently working standard business hours. Systems 10 can also be deployed in a corporate hierarchy where business divisions work separately and support a rollup to a centralized management function.

Examining each of the various components in further detail, we begin with the agents 12. Agents 12 are used to collect, reduce and normalize the enormous amount of data that is generated by a network's security devices before a manager 14 acts on the data. As will become evident, this process goes beyond simple log consolidation. Before presenting those details, however, and to understand why such measures are desirable, some background regarding how analysts currently cope with security event information generated by multiple network devices is useful.

Conventional intrusion detection systems can help an analyst detect an attack directed at a network resource such as a server. Usually, such investigations are launched in response to an alert generated by the IDS. As a first step after receiving such an alert, an analyst might review perimeter router logs to see if a router associated with the network passed a packet that triggered the alert. If such a packet were discovered, the analyst would likely then want to review one or more firewall logs to see if any existing filters blocked the suspect packet. Assume, for the sake of this example, the suspect packet got past any firewalls; further investigation would be necessary to determine whether the integrity of the server itself was compromised. Such an integrity check may be performed using a conventional software application such as Tripwire, which is a file integrity checker employing MD5 checksums, to see which files, if any, had been accessed or modified. Finally, the analyst may have to examine a Syslog or an EventLog from the subject server, as well as any tcpdump data collected by a dedicated tcpdump host, for the segment of time surrounding the attack to determine what actually happened.

By this time the analyst has accessed many different systems and looked at several different types of logs in an effort to distill a comprehensive view of the attack. This can be a significant amount of work, and time taken in such review and analysis is time lost from the vitally important tasks of securing the network and restoring the compromised server to make sure that no other systems will be affected. The present invention helps to minimize the time spent on such analysis by consolidating all the relevant information in a single logging facility, allowing the analyst to look at the data in whatever sequence or depth he or she requires.

More than just consolidation, though, the present agents 12 provide data normalization, which is of great benefit when an analyst must deal with security incidents in a heterogeneous network environment. To understand why normalization is helpful consider a typical enterprise environment, which consists of many different types of network devices ranging from border routers and VPN devices, to firewalls and authentication servers, and a wide range of application servers such as web servers, e-mail servers and database servers. Each of these devices generates logs that, as described above, are sources of data to a security analyst. However, it is seldom, if ever, the case that two manufactures will use the same event logging mechanism or format their event logs identically. For example a Cisco Systems PIX™ firewall will not report an accepted packet in the same way as a Check Point firewall or even in the same fashion as a Cisco Systems router.

An example of the types of various reports that might be generated by different network devices is presented below in Table 1, which shows examples of logs from different network devices, each reporting the same packet traveling across a network. In particular, these logs represent a remote printer buffer overflow that connects to IIS servers over port 80.

TABLE 1

Examples of Event Logs for Different Network Devices.

| Network Device | Event Log |
|---|---|
| Check Point firewall | "14" "21Dec2001" "12:10:29" "eth-s1p4c0" "ip.of.firewall" "log" "accept" "www-http" "65.65.65.65" "10.10.10.10" "tcp" "4" "1355" " " " " " " " " " " " " " " " " " " " "firewall" " len 68" |
| Cisco Systems router | Dec 21 12:10:27: %SEC-6-IPACCESSLOGP: list 102 permitted tcp 65.65.65.65(1355) –> 10.10.10.10(80), 1 packet |
| Cisco Systems PIX firewall | Dec 21 2001 12:10:28: %PIX-6-302001: Built inbound TCP connection 125891 for faddr 65.65.65.65/1355 gaddr 10.10.10.10/80 laddr 10.0.0.111.22/80 |
| Snort | [] [1:971:1] WEB-IIS ISAPI .printer access [] [Classification: Attempted Information Leak] [Priority: 3] 12/21-12:10:29.100000 65.65.65.65:1355 –> 10.10.10.10:80 TCP TTL:63 TOS: 0x0 ID:5752 IpLen:20 DgmLen:1234 DF *AP* Seq: 0xB13810DC Ack: 0xC5D2E066 Win: 0x7D78 TcpLen: 32 TCP Options (3) => NOP NOP TS: 493412860 0 [Xref => http://cve.mitre.org/cgi-bin/cvename.cgi?name=CAN-2001-0241] [Xref => http://www.whitehats.com/info/IDS533] |

The Check Point record contains the following fields: event id, date, time, firewall interface, IP address of the firewall interface, logging facility, action, service, source IP, target IP, protocol, source port, some Check Point specific fields and then the size of the datagram. This report is, to say the least, difficult for a human analyst to read (especially with all the empty fields that are represented by double quotes). The Cisco router has a different format: date, time, logging facility, event name, source IP, source port, target address, target port, and number of packets. The Cisco PIX firewall, which is produced by the same manufacturer as the router, uses yet another format: date, time, event name, source IP, source port, translated address or target address, target port, local address, and local port.

The final record is a Snort alert that claims this traffic was malicious. Snort is a well-known network IDS and the fields it populates are: exploit or event name, classification, priority, date, time, source IP, source port, target IP, target port, protocol, TTL (time to live), type of service, ID, IP length, datagram length, tcp flags, sequence number, acknowledgement number, window size, and tcp length. Snort also reports additional data such as references to investigate the exploit.

Agents 12 may be deployed in connection with some or all of these (and other) network components and applications. For example, in FIG. 1, agent 12a is deployed in connection with an IDS (such as Snort). Agent 12b is deployed in connection with a firewall (such as the Check Point firewall and/or the Cisco PIX firewall). Agent 12c is deployed in connection with other network components or agents (e.g., a router). Each of these agents receives the event information from its associated network device or application in that device's or application's native format and converts (or normalizes) the information to a common schema using the normalize component. This normalization allows for later storage of the event information in a format that can more readily be utilized by an analyst. Events may be received directly from network security device or by accessing a shared memory or some other means.

Many normalized schemas can be used and, in general, choosing the fields of a common schema may be based on content rather than semantic differences between device logs and/or manufacturers. To accomplish this normalization, agents 12 are equipped with a parser configured to extract values from the events as reported by the individual network devices/applications and populate the corresponding fields in the normalized schema. This population may occur according to a mapping maintained by the agent 12. Table 2 is an example of a normalized schema for the data reported by the devices in Table 1.

TABLE 2

Common Schema Representation of Event Data

| Date | Time | Event Name | Src_IP | Src_Port | Tgt_IP | Trg_Port | Device Type | Additional data |
|---|---|---|---|---|---|---|---|---|
| 21 Dec. 2001 | 12:10:29 | accept | 65.65.65.65 | 1355 | 10.10.10.10 | 80 | Check Point | |
| 21 Dec. 2001 | 12:10:27 | list 102 permitted tcp | 65.65.65.65 | 1355 | 10.10.10.10 | 80 | Cisco Router | |
| 21 Dec. 2001 | 12:10:28 | built inbound tcp connection | 65.65.65.65 | 1355 | 10.10.10.10 | 80 | Cisco PIX | |
| 21 Dec. 2001 | 12:10:29 | WEB-IIS ISAPI.printer access | 65.65.65.65 | 1355 | 10.10.10.10 | 80 | Snort | TCP TTL: 63 TOS: 0x0 ID: 5752 IpLen: 20 DgmLen: 1234 DF *AP* Seq: 0xB13810DC Ack: 0xC5D2E066 Win: 0x7D78 TcpLen: 32 TCP Options (3) => NOP NOP TS: 493412860 0 |

Table 2 reports the same four events described earlier, this time in a normalized fashion. Each of the agents 12 is configured to extract the relevant data from events reported by its associated network device/application and map that data to the corresponding common schema representation. For instance the Check Point firewall reports a target port as www-http, not as port 80 as is the case for most other network devices. Therefore an agent 12 associated with the Check Point firewall is configured with an appropriate lookup mechanism (e.g., a table) to ensure that "www-http" as reported by the firewall gets translated into "port 80" when the agent 12 reports the event to the manager 14.

Similarly, the agents 12 may need to be configured to convert the date/time stamp formats used by the various network devices/applications into a common date/time representation. That is, because the different network devices/applications all use different date/time formats, the agents cannot simply report the date/time stamps reported by the device/application. Instead, the agents 12 may be configured to convert local date/time stamps to a universal date/time notation, such as Greenwich Mean Time.

In addition to normalizing event data by fields, agents 12 can parse the event data stream and set field values based on conventions and practices of the organization. For example, the variety of event severity levels that devices produce can all be normalized at the agent level into a single, consistent hierarchy.

Thus, agents 12 collect and process events generated by heterogeneous network devices/applications throughout an enterprise. Alerts can come from routers, e-mail logs, anti-virus products, firewalls, intrusion detection systems, access control servers, VPN systems, WindowsNT Event Logs, UNIX Syslogs, and other sources where security threat information is detected and reported. In some embodiments, each event generator has an agent 12 assigned to collect all relevant security information, while in other embodiments agents are shared among two or more event generators. Thus, depending on the device/application to be monitored and the in-place infrastructure, a choice is provided for simple log parsing and loading, network listening (e.g., through SNMP traps), installation on aggregation points (Syslog servers and concentrators) and full distribution to all security-relevant devices.

In addition to collecting and normalizing data from security devices, the agents 12 intelligently manage the data with:

Filtering: each agent 12 can be configured according to conditions by which data will be collected and sent to the manager 14. This helps to reduce the need to collect and manage large volumes of unwanted data.

Aggregation: Based on the time period selected, the agents 12 can collect duplicate alerts but send only a single message with a count of the total number of such alerts to the manager 14. This helps reduce the amount of traffic transmitted across the network.

Batching: Agents 12 can be configured to send a collection of alerts at one time rather than sending alerts immediately after each occurrence.

Figures 2, 3:
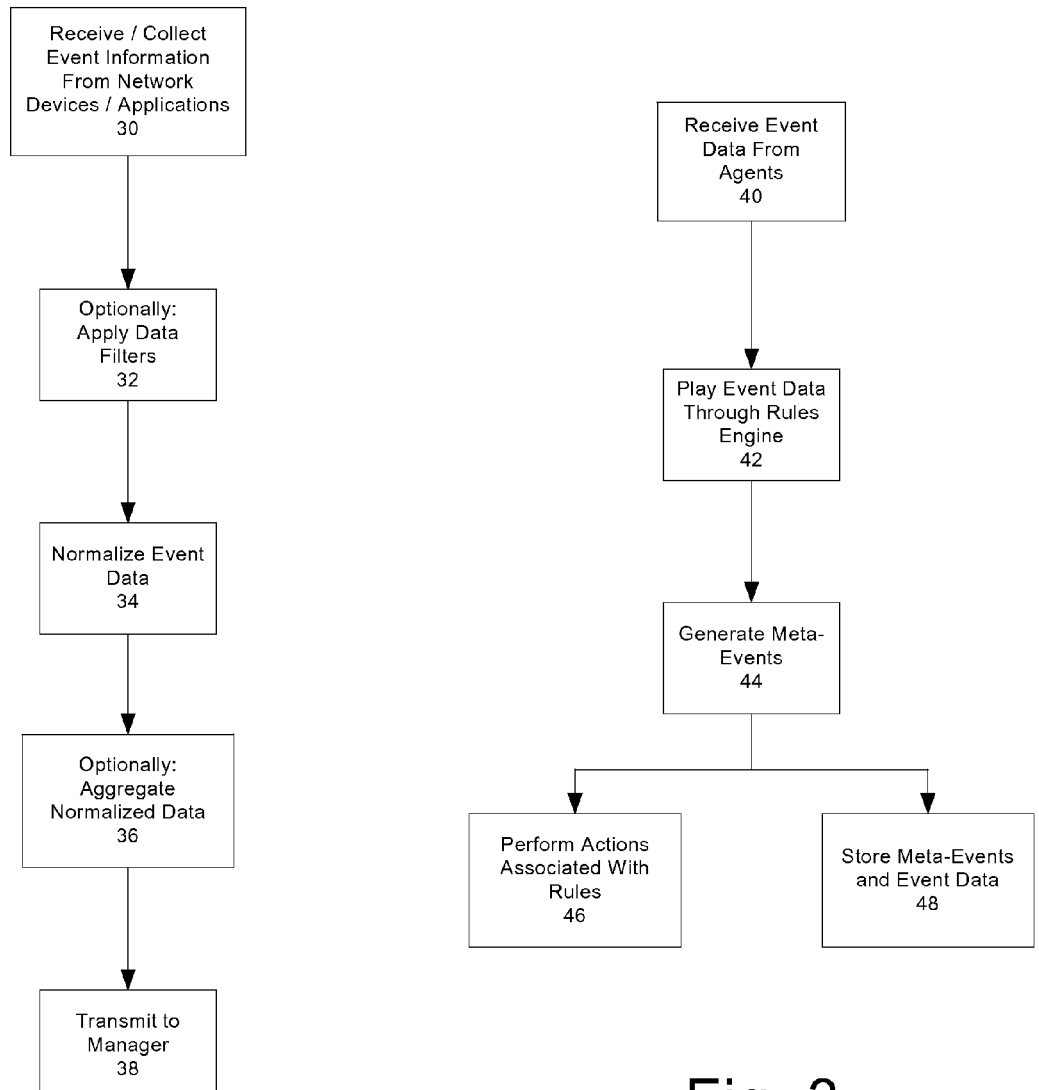
FIG. 2 illustrates procedures followed by an agent configured in accordance with an embodiment of the present invention when collecting, normalizing and reporting security event data.
FIG. 3 illustrates procedures followed by a manager configured in accordance with an embodiment of the present invention when analyzing security event data and generating alerts based thereon.

FIG. 2 illustrates the various processes performed by agents 12 from the point of view of the event information. Initially, at step 30, the raw event information is received or collected from the native network device or application in that device's/application's native format. At this point (or, optionally, following normalization), data filters may be applied to reduce the volume of data being passed for further analysis (step 32). Such filtering is optional and may involve assessing the captured data against one or more conditions to determine whether or not the data is relevant for further analysis.

Thereafter, the event data is normalized at step 34. As indicated above, the normalization may occur at the field and/or the field value level. Further, the normalization may involve translation of the field values into nomenclatures/formats used across an enterprise.

Following normalization, the event data may, optionally, be aggregated (step 36) before being transmitted to the manager 14 (step 38). The transmissions may occur as the events are captured or may be made on a batched basis. In either case, the messages used to transmit the event data preferably include all of the source fields of an event. By delivering the entire event data set (i.e., all of the source fields) organized in a consistent format (i.e., the common schema), powerful upstream data management, cross-correlation, display and reporting is available to the security team. In some embodiments the event data is discarded after successful transmission to the manager 14, but in other cases the data may be cached for a time at the agent 12 to permit later replay of the data.

Referring again to FIG. 1, the manager 14 includes one or more agent managers 26, which are responsible for receiving the event data messages transmitted by the agents 12. Where bi-directional communication with the agents 12 is implemented, these agent managers 26 may be used to transmit messages to the agents 12. If encryption is employed for agent—manager communications (which is optional), the agent manager 26 is responsible for decrypting the messages received from agents 12 and encrypting any messages transmitted to the agents 12.

Once the event data messages have been received (and if necessary decrypted), the event data is passed to the rules engine 18. Rules engine 18 is at the heart of the manager 14 and is used to cross-correlate the event data with security rules in order to generate meta-events. Meta-events, in the context of the present invention, are instances of (usually) multiple individual event data elements (gathered from heterogeneous sources) that collectively satisfy one or more rule conditions such that an action is triggered. Stated differently, the meta-events represent information gathered from different sensors and presented as correlated results (i.e., the decision output of the rules engine 18 indicating that different events from different sources are associated with a common incident as defined by one or more rules).

The actions triggered by the rules may include notifications transmitted (e.g., via notifier 24) to designated destinations (e.g., security analysts may be notified via the consoles 16, e-mail messages, a call to a telephone, cellular telephone, voicemail box and/or pager number or address, or by way of a message to another communication device and/or address such as a facsimile machine, etc.) and/or instructions to network devices (e.g., via agents 12 or via external scripts or programs to which the notifier 24 may pass arguments) to take action to thwart a suspected attack (e.g., by reconfiguring one or more of the network devices, and or modifying or updating access lists, etc.). The information sent with the notification can be configured to include the most relevant data based on the event that occurred and the requirements of the analyst. In some embodiments, unacknowledged notifications will result in automatic retransmission of the notification to another designated operator.

As part of the process of generating meta-events, rules engine 18 examines the received events to determine which (if any) of the various rules being processed in the system may be implicated by a particular event or events. A rule is considered to be implicated if an event under test has one or more attributes that satisfy, or potentially could satisfy, one or more rules. For example, a rule can be considered implicated if the event under test has a particular source address from a particular subnet that meets conditions of the rule. Events may remain of interest in this sense only for designated time intervals associated with the rules and so by knowing these time windows the rules engine 18 can store and discard events as warranted. Any interesting events may be grouped together and subjected to further processing by the rules engine 18.

As discussed below, when meta-events are generated by the rules engine 18, on-screen notifications may be provided to consoles 16 to prompt users to open cases for investigation of the events which led to the notification. This may include accessing knowledge base 28 to gather information regarding similar attack profiles and/or to take action in accordance with specified procedures. The knowledge base 28 contains reference documents (e.g., in the form of web pages and/or downloadable documents) that provide a description of the threat, recommended solutions, reference information, company procedures and/or links to additional resources. Indeed, any information can be provided through the knowledge base 28. By way of example, these pages/documents can have as their source: user-authored articles, third-party articles, and/or security vendors' reference material.

In one embodiment, the rules engine 18 is based on a RETE engine configured to preserve event information state over configurable time windows so as to provide correlation of the event data according to specified rules. Correlation is generally regarded as a process of bringing information items into mutual relation. In the context of the present invention, correlation through rules engine 18 provides the ability to access, analyze, and relate different attributes of events from multiple sources to bring something to the attention of an analyst that might (or likely would) have otherwise gone unnoticed. In other words, the rules engine 18 provides the ability to determine what type of incident is represented by a collection of events reported by a number of heterogeneous network devices and/or applications. Because the collected event data is normalized into a common event schema, correlation can be performed utilizing any field including, but not limited to, geography, device type, source, target, time thresholds, and/or event type. Based on alerts generated by the rules engine 18, operators are provided with a workflow for investigating these incidents.

Turning to FIG. 3, the manager 14 receives (step 40) and analyzes (step 42) the event data reported by agents 12 in real-time (or near real-time owing to network latencies and depending upon whether or not batched message transmission is used) according to a set of flexible rules. The rules define which events generate an alert, when those events generate an alert, and what actions are associated with the alert. Hence, the rules may be written to contain event conditions, thresholds, and actions. In some cases, related meta-events may be grouped together to determine if a threshold of a time-based rule is reached. For example, time-based rules can require that an event occur ten times in an hour to signify that an action needs be performed. If that threshold is not reached, the group of meta-events is discarded. If the threshold is reached, however, then a second stage meta-event may be generated and an action based thereon initiated. Higher level meta-events (such as third stage meta-events and so on) may also be generated.

In some embodiments the rule conditions may be specified using Boolean operators and/or database queries. When incoming events match a particular rule's conditions and thresholds, causing a meta-event to be generated (step 44), the rule automatically fires the action that has been defined (step 46). Such actions can include, but are not limited to: executing a pre-determined command or script, logging the alert, sending the alert to the consoles 16, sending the alert to notification designees, setting custom severity levels for the alert based on cumulative activity, adding a source to a suspicious list or a target to a vulnerable list, and/or a combination of these actions.

Rules may be created at the manager 14 and/or at the consoles 16 using a flexible scripting language. An example of a rule might be:

If (an ids evasion attack) occurs (from the same source ip address) (3 times) within (2 minutes) then (send message to console) and (notify the security supervisor via pager).

In this example, the incoming event data would be compared against the rule conditions and thresholds (in the above example 3 events that satisfy the condition of an IDS evasion attack are required and all must originate from a common source IP address and be detected within 2 minutes of each other), and if those criteria are satisfied the designated actions (here, sending an alert message to the consoles 16 and also notifying a security supervisor via a pager) would be performed. The correlation rules that operate on the events evaluate threats and attacks according to selected criteria (e.g., degree of threat, level of success, vulnerability of target and value of target) and generate alerts according to a security intelligence taxonomy that focuses attention on the most dangerous and potentially most damaging attacks. For example, threats to network assets that are deemed not to have succeeded or that are not likely to succeed may be coded green, while those that have succeeded or have a high probability of success might be coded red. The value of the security information taxonomy lies in its ability to eliminate false positives while clearly identifying real threats to vulnerable and valuable assets.

In general, the rules may be designed to capture threats and attacks that are typical in large, diverse networks and may be organized to provide multiple lines of defense by detecting specific activities and grouping them according to level of threat such as:

Reconnaissance zone transfer, port scan, protocol, scanning, etc.

Suspicious illegal outgoing traffic, unusual levels of alerts from the same host, etc.

Attack overflow, IDS evasion, virus, denial of service, etc.

Successful compromise of a backdoor, root compromise, covert channel exploit, etc.

Similar events and signatures may be grouped into rule categories that can be utilized by the rules to insulate the rule from changes in vendor-specific event details. For example, event names may change between product releases or new devices may be added to the network infrastructure with a new set of nomenclature. Since the rule categories map similar signatures into a single name that is used by the rules engine, if an individual network device changes taxonomy, only the mapping is changed, not the rule definition. Therefore, despite changes in individual devices, the investment in custom defined rules is preserved.

After the events are processed by rules engine 18, the raw event data as well as any meta-events that were generated are stored in database 20 (step 48). In some embodiments, the raw event data may be stored prior to or concurrently with processing of the data by rules engine 18. Regardless of the sequence, such storage of the event data (and the meta events generated by the rules engine 18) preserves a historical record of the event traffic and allows for replaying of the events through an existing or a new rule set (either at the manager 14 or the consoles 16) in order to assess the efficacy of new rules, for training purposes, and/or for case investigation.

Correlation via the rules ensures that credible threats and attacks come to the attention of the security staff on a high-priority basis. Hence once an alert is received, the operator can perform in-depth analysis and take aggressive action secure in the knowledge that the effort is well spent. When a rule match is reported to a console 16, the analyst can quickly drill down (through an associated graphical user interface) to see all of the individual events that caused the rule to fire. If necessary, the analyst can investigate even further to see all of the individual data elements captured for those events.

When action is required, the present invention provides a full set of tools and services for the operator. Resources such as the rule definition, a knowledge base article containing company policies and recommended actions, and the development of a complete case docket describing the problem assist the operator in responding immediately to critical security threats. If necessary, the operator can proactively deal with an attack by launching specific applications or scripts from the console 16 to reconfigure device settings or change access privileges.

The console 16 provides a centralized view into the security status of an enterprise and gives administrators, analysts, and operators an interface to perform security management tasks. This view is provided through a graphical user interface (GUI) that can be run in Windows™, Linux™, Apple™, Palm™ or similar operating environments. Furthermore, console 16 can be executed as an independent software application in the aforementioned operating environments or also be web enabled via a web browser such as Internet Explorer™ or Netscape Navigator™. In various embodiments, the console's GUI provides event display in real-time or in replay mode (i.e., the ability to playback events from a given time period according to a VCR or DVD metaphor). Replay may be had from the events stored in database 20 or, in some instances, from caches associated with agents 12. This latter form of replay is especially useful because it provides improved simulation of actual network conditions as the events are played out across the same network as during the original attack.

One embodiment of the GUI for console 16 includes five configurable areas of interest: a toolbar area that contains a file menu area as well as the event playback controls; a navigation panel that allows a user to view system assets (as well as dashboards) in an organized manner; an inspect/edit panel through which a user can examine a specific event in great detail; a views panel that allows a user to view security events from heterogeneous sources; and a status bar that describes the current state of the time-based events selected by a user. All areas of this GUI are user configurable and customizable. For example, rather than providing a list of events in response to query, playback controls allows a user to simulate the events as they occurred in time. The events may be played back over a user specified time period with a specified speed factor. The speed factor is set by the user to either speed up or slow down playback as compared to real time. The playback controls also provide a graphical display of the volume and severity (or other attributes) of the events, allowing users to be apprised of such matters at a glance.

Through this GUI then, consoles 16 provide operators with complete drill-down capability from the highest level of detail (e.g., the entire rage of events) to the lowest level of detail (e.g., fields within a single event). This allows analysts to probe at whatever level of detail is required to gain further insight into an attack and assess vulnerability. This varying level of detailed analysis is made possible because the agents 12 report all of the event data fields, not merely a subset thereof. By way of example, one tool provides analysts with the ability to quickly see similar characteristics of events using a cursor control operation, such as a mouse click. For example, if analysts are presented with a meta-event alert that consists of, say, twenty or more individual events reported by several different agents associated with different network devices, the present user interface associated with consoles 16 allows the analyst to quickly visualize only the common fields of these events (e.g., such as a source IP address) by simply highlighting the events and performing a mouse click/select operation.

Once security personnel have been notified of a meta-event, they can utilize the knowledge base to determine the appropriate actions. In addition, security analysts may undertake investigations of events and/or meta-events. In general, such matters can be assigned to so-called cases. Stated differently, cases create a workflow and oversight environment for situations where there are suspicious events requiring further investigation. Once a case is created, it can be assigned to an operator, investigated, and resolved based on the business policies and practices of the enterprise (e.g., as documented in knowledge base 28). The security staff can also add narration and event information to a case, or view open cases to determine their status and any required next steps.

Consoles 16 also provide a front-end for the administration of the entire system 10. This may include system configuration such as setting up operators, notification, agent behavior, etc. User management (such as creating and modifying users, access, roles, and responsibilities), rules management (e.g., authoring, viewing, and updating rules), and workflow management (e.g., setting up the flow of actions taken when an event is received) may also be handled through the consoles 16. Finally, the consoles 16 allow for remote access, thus supporting divisional responsibility and "follow-the-sun" management.

Figure 4:
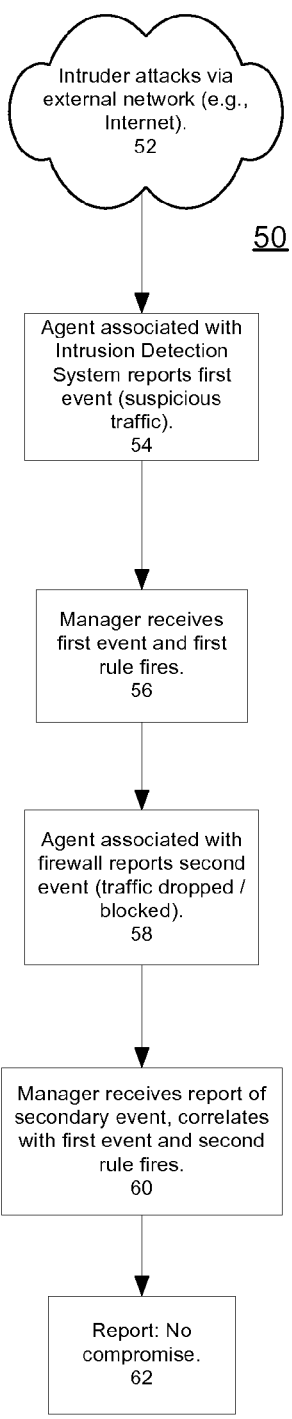
FIG. 4 illustrates an example of an unsuccessful attack against a network asset detected, analyzed and reported by a computer-based system configured in accordance with an embodiment of the present invention.

Having thus described the elements of system 10, it is helpful to present some examples of how the system operates. FIG. 4 illustrates an example attack scenario 50. In this example, an intruder attacks a network from an external source (block 52) and an agent associated with a network IDS reports (block 54) an associated event. Once the event is reported to the manager (block 56), the rules engine analyzes the event against the rule set and identifies the event as one corresponding to a particular set of criteria (i.e., the rule associated with this attack profile fires). For sake of example, assume this event is recognized as a WEB-IIS ISAPI.printer access attack. Since this is a very common technique for hackers, this type of alert may be generated many times a day.

The correlation provided by the rules engine shows that this attack is being directed towards a mission-critical asset (e.g., a mission critical network host identified by the destination IP address). Based on the security intelligence taxonomy, the meta- (or combined) event may be coded yellow, which puts the security staff on moderate alert that trouble may be brewing, and the event reported as such to one of the consoles. Since the attacker seems to have important information about internal assets (e.g., the attacker appears to have known to direct an attack to a mission critical network asset), the source IP address may be automatically placed on a list of suspicious sources, which the rules engine automatically monitors for future threatening activity.

The next point of communication comes when an agent associated with a firewall reports that threatening traffic has been "dropped" and the transaction blocked (block 58). This event is reported to the manager (block 60) and the rules engine correlates this event with the previous one (even though the two events are associated with different network devices and occurred at different times). Without the ability to correlate events across devices and/or over an extended period of time, the security staff might still be wondering if the potential attack initially reported by the IDS turned into a real asset compromise, or worse, spending scarce investigation resources trying to determine whether anything had happened. Instead, the correlation provided by the rules engine at the manager allows the report of the successful firewall block to be associated with the earlier suspicious activity and the entire meta-event reported (block 62) as a green (or benign) item of information given that no compromise to the network asset actually occurred. The incident may be automatically closed out and recorded in the database for auditing purposes.

This scenario points out the ability of the present invention to reduce the number of false positives reported to security personnel. During forensic analysis, a successful attack can often be traced through a series of events, network transversals and corresponding alarms and alerts. Once the damage is done, the historical reconstruction often generates a reaction of "if we only had seen this coming." The reason attacks presently go undetected by conventional systems or human analysts is that typically there is no way to examine and analyze the hundreds or thousands of alarms and alerts that firewalls, intrusion detection systems, and other devices or applications generate every day. Viewed individually, these alarms look like they should be investigated, but an extremely high percentage turn out to be harmless because the asset is not vulnerable or the attack is blocked in the network infrastructure. The real-time, cross-device correlation provided by the present invention tracks threats and attacks while they are occurring and delivers the information needed to identify and resolve real problems while ignoring unsuccessful or benign threats.

Figure 5:
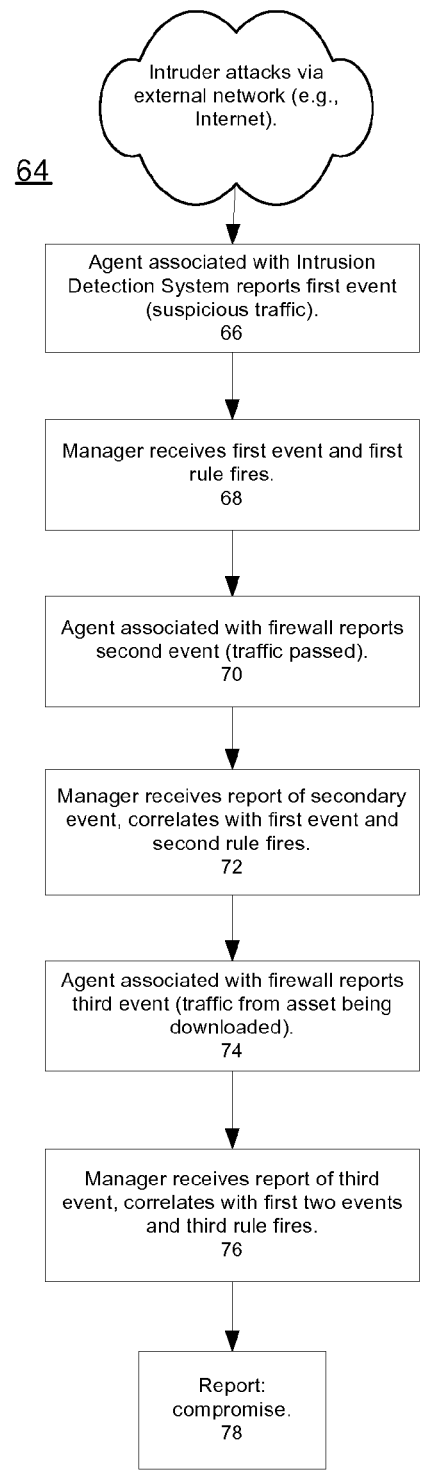
FIG. 5 illustrates an example of a successful attack against a network asset detected, analyzed and reported by a computer-based system configured in accordance with an embodiment of the present invention.

Returning to the previous example, the same sequence of events will have a far different outcome if the firewall does not block the attack, as is shown in the scenario 64 depicted in FIG. 5. Here, not only does the attack reach the intended target, the system is compromised. This time, the agent associated with the network IDS reports the event associated with a suspected attack (block 66) and the rules engine identifies the event as being the WEB-IIS ISAPI.printer access attack (block 68). Again the event is coded as being important, and the source IP address is automatically placed on the list of suspicious sources.

Next the agent associated with the firewall reports that threatening traffic has been "passed" (block 70). This event is reported to the manager and this time the correlation provided by the rules engine spots the firewall being successfully traversed and fires the rule that elevates the level of threat to red (block 72), which indicates that an attack is progressing inside the network perimeter against a mission critical asset. There is still no indication that the attack has been successful, but the security staff now has sufficient information to put them on high alert.

Finally, the agent associated with the firewall reports the downloading of information from the server (block 74) and when the manager receives and correlates this event with the previous two, the rules engine fires a third rule (block 76) generating a report that advises the security team that the host has been compromised (block 78). In this instance, a "double red" alarm may be generated by the rules engine when it sees that the targeted system is now sending information to the attacking source, a clear indication of a successful attack. In the course of what may be no more than a few seconds, the notifications provided through the correlation process have progressed from a "caution" or yellow condition to a double red or "compromised system" condition based on correlated alarms and alerts from the agents associated with the IDS and firewalls in the network.

As part of this report/alert escalation, there may have been a number of e-mails, pages and/or other notifications sent by the manager to various staff members. With this information the security staff has a precisely defined incident to investigate and resolve and they can immediately diagnose the problem. This may include searching the database (e.g., using the replay mode) for other activity from the same source IP address, consulting the knowledge base for suggested remedies, or opening a case and assigning it to an analyst for follow-up.

In these examples, without the real time cross-device correlation that the present invention provides, the security staff could have been preoccupied with the first unsuccessful attack while the second (or other) attacks transpired unnoticed. With the ability to correlate attack severity and success with asset value and vulnerability, the present invention delivers increased security effectiveness while improving the efficiency of the security operation.

Thus, a computer-based system for capturing, correlating and reporting security events from heterogeneous sources has been described. In the foregoing description, the various examples and embodiments were meant to be illustrative of the present invention and not restrictive in terms of their scope. Accordingly, the invention should be measured only in terms of the claims, which follow.

What is claimed is:

1. A method for monitoring security of a computer network, the computer network comprising network devices, the method comprising:
receiving security events generated by the network devices, wherein a security event generated by a network device is in a format used by the network device;
modifying the security events to normalize the security events to a common schema, wherein the common schema includes a category that represents an event name;
selecting one or more of the normalized security events according to a filter; and
cross-correlating the selected security events with a rule, wherein the cross-correlating is performed remotely from the normalizing.

2. The method of claim 1, wherein the security event generated by the network device originated in an event log that was generated by the network device.

3. The method of claim 1, wherein the security event generated by the network device comprises information about operation of the network device.

4. The method of claim 1, wherein the network device comprises one of a router, a firewall, a network intrusion detection system, an access control server, a virtual private network system, a database, an anti-virus product, a software application, an e-mail log, an operating system log, and an event log.

5. The method of claim 1, further comprising determining when the rule is satisfied.

6. The method of claim 5, further comprising responsive to the rule being satisfied, performing an action.

7. The method of claim 6, wherein the action comprises generating a notification.

8. The method of claim 7, wherein the notification comprises one of an e-mail message, a pager message, a telephone message, a facsimile message, and an alert to be displayed by a computer system.

9. The method of claim 6, wherein the action comprises generating a meta-event.

10. The method of claim 9, further comprising storing the meta-event in a database.

11. The method of claim 1, further comprising storing the selected security events in a database.

12. The method of claim 11, wherein the storing occurs after the cross-correlating.

13. The method of claim 1, wherein normalizing a security event to a common schema comprises:
parsing the security event to extract event field values; and
populating corresponding fields in the common schema with the extracted event field values.

14. The method of claim 1, further comprising aggregating two or more normalized security events into an aggregated event, wherein the aggregated event includes a number that represents how many normalized security events were aggregated.

15. The method of claim 14, wherein the aggregating is performed remotely from the cross-correlating.

16. The method of claim 1, further comprising transmitting the selected security events, wherein the transmitting occurs prior to the cross-correlating.

17. The method of claim 16, wherein the transmitting occurs in batch mode.

18. A system for monitoring security of a computer network, the computer network comprising network components, the system comprising:
one or more software agents, including a software agent configured to receive event information from one or more network components, wherein event information received from a network component is in a format used by the network component, and further configured to modify the event information to normalize the event information to a common schema and to filter the normalized event information, wherein the common schema includes a category that represents an event name; and a server-based manager configured to receive filtered event information from the one or more software agents and further configured to cross-correlate the filtered event information with a rule.

19. The system of claim 18, further comprising a database communicatively coupled to the manager, wherein the manager is further configured to store the filtered event information in the database.

20. The system of claim 18, wherein the manager is further configured to determine when the rule is satisfied and to generate a notification responsive to the rule being satisfied.

21. The system of claim 20, further comprising a console communicatively coupled to the manager, wherein the console is configured to receive from the manager the notification.

22. The system of claim 21, wherein the rule was generated at the console and transmitted to the manager.

23. The system of claim 20, further comprising a knowledge base comprising information regarding the notification.

24. The system of claim 18, wherein the network components are heterogeneous.

25. The system of claim 18, wherein the software agent is further configured to aggregate two or more normalized security events into an aggregated event, wherein the aggregated event includes a number that represents how many normalized security events were aggregated.

26. The system of claim 18, wherein the software agent is further configured to transmit the filtered event information to the manager.

27. The system of claim 26, wherein the transmitting occurs in batch mode.

28. A non-transitory computer readable medium, having stored thereon computer-readable instructions, which when executed in a computer system, cause the computer system to monitor security of a computer network, the computer network comprising network devices, by cross-correlating events with a rule, an event having been received from a network device in a format used by the network device and modified to normalize the event to a common schema and the normalized event selected according to a filter, wherein the common schema includes a category that represents an event name.

29. The non-transitory computer readable medium of claim 28, having stored thereon further computer-readable instructions, which when executed in the computer system, cause the computer system to perform an action responsive to the rule being satisfied.

30. The non-transitory computer readable medium of claim 29, wherein the action comprises generating a notification.

31. The non-transitory computer readable medium of claim 30, wherein the notification comprises one of an e-mail message, a pager message, a telephone message, a facsimile message, and an alert to be displayed by a computer system.

32. A non-transitory computer readable medium, having stored thereon computer-readable instructions, which when executed in a computer system, cause the computer system to receive event information from an associated network device, wherein the event information is in a format used by the associated network device, and to modify the event information to normalize the event information to a common schema, and to filter the normalized event information, wherein the common schema includes a category that represents an event name.

33. The non-transitory computer readable medium of claim 32, having stored thereon further computer-readable instructions, which when executed in the computer system, cause the computer system to transmit filtered event information to a remote computer system.

34. The non-transitory computer readable medium of claim 33, having stored thereon further computer-readable instructions, which when executed in the computer system, cause the computer system to aggregate the filtered event information prior to transmission.

35. The non-transitory computer readable medium of claim 33, having stored thereon further computer-readable instructions, which when executed in the computer system, cause the computer system to transmit filtered event information in batch mode.

* * * * *